United States Patent [19]
Miller et al.

[11] Patent Number: 5,878,228
[45] Date of Patent: Mar. 2, 1999

[54] DATA TRANSFER SERVER WITH TIME SLOTS SCHEDULING BASE ON TRANSFER RATE AND PREDETERMINED DATA

[75] Inventors: Scott Edward Miller; David Michael Alexander, both of Nepean, Canada

[73] Assignee: Northern Telecom Limited, Montreal, Canada

[21] Appl. No.: 749,687

[22] Filed: Nov. 15, 1996

[51] Int. Cl.$^6$ .................................................. G06F 15/16
[52] U.S. Cl. ..................................... 395/200.65; 370/458
[58] Field of Search ..................................... 370/392, 232, 370/252; 707/205; 395/200.47, 182.02, 849, 556; 369/60; 364/243, 238.6

[56] References Cited

U.S. PATENT DOCUMENTS

| | | | |
|---|---|---|---|
| 5,218,695 | 6/1993 | Noveck et al. | 707/205 |
| 5,276,850 | 1/1994 | Sakaue | 364/243 |
| 5,280,470 | 1/1994 | Buhrke et al. | 370/232 |
| 5,293,617 | 3/1994 | Okada | 364/238.6 |
| 5,363,369 | 11/1994 | Hemmady et al. | 370/392 |
| 5,485,370 | 1/1996 | Moss et al. | 395/200.47 |
| 5,526,483 | 6/1996 | French et al. | 395/182.02 |
| 5,579,503 | 11/1996 | Osborne | 395/200.64 |
| 5,623,607 | 4/1997 | Kodama et al. | 395/849 |
| 5,631,888 | 5/1997 | Itoh et al. | 369/60 |
| 5,634,042 | 5/1997 | Kashiwagi et al. | 395/556 |
| 5,701,292 | 12/1997 | Chiussi et al. | 370/232 |
| 5,706,281 | 1/1998 | Hashimoto et al. | 370/252 |

*Primary Examiner*—Dung C. Dinh
*Assistant Examiner*—Chuong Ho
*Attorney, Agent, or Firm*—John A. Granchelli; Jean-Pierre Fortin

[57] ABSTRACT

This invention relates to a method and protocol to enable a simple, reliable and highly scaleable data transfer facility in a digital data network. A connectionless, unacknowledged data transfer protocol minimizes resource utilization at a data server and is combined with source rate control to reduce congestion in the intervening network. The data transfer server implementing the protocol, operates by defining a circular ordering of individual scheduling timeslots having zero or more download records. The server selects in sequence, at a predetermined rate, the individual scheduling timeslots, and services, responsive to the selected timeslot having at least one download record, each record therein according to parameters in that record. Servicing includes (I) sending, to the destination address, a download message which includes a block of data extracted from the identified data, based on the remaining data information; (ii) updating the remaining data information to reflect the block of data that was sent; and (iii) rescheduling, based on the transfer rate and the predetermined rate, the download record into an appropriate one of the scheduling timeslots.

18 Claims, 9 Drawing Sheets

MESSAGE HEADER

| Fields | Size (bytes) |
|---|---|
| version | 2 |
| messageID | 2 |
| messageLength | 2 |
| transactionID | 2 |

FIG. 2

GET FILESIZE MESSAGE

| Fields | Size (bytes) |
|---|---|
| messageHeader (messageID = 0x00F5) | 8 |
| destinationAddress | 4 |
| destinationPort | 2 |
| fileDescriptorLength | 1 |
| fileDescriptor | variable |

FIG. 3

FILESIZE DATA MESSAGE

| Fields | Size (bytes) |
|---|---|
| messageHeader (messageID = 0x00F6) | 8 |
| filesize | 4 |

FIG. 4

DOWNLOAD START MESSAGE

| Fields | Size (bytes) |
|---|---|
| messageHeader (messageID = 0x00F3) | 8 |
| startByte | 4 |
| numBytes | 4 |
| destinationAddress | 4 |
| destinationPort | 2 |
| blockSize | 2 |
| delay | 2 |
| fileDescriptorLength | 1 |
| fileDescriptor | variable |

FIG. 5

DOWNLOAD DATA MESSAGE

| Fields | Size (bytes) |
|---|---|
| messageHeader (messageID = 0x00F4) | 8 |
| firstByte | 4 |
| numBytes | 2 |
| edition | 4 |
| data | numBytes |

FIG. 6

REQUEST HANDLER PSEUDOCODE

```
while (TRUE)
   wait for message
   CASE msg on

Get Filesize request:
      Get filesize from filesystem
      Send filesize reply to client
      back to main loop File Download request:
      if ( server is overloaded ) or
         ( server thinks servicing request would harm
      then                                     network )
         discard request
      endi if ( file is in cache )
      then
         if ( file is current )
         then
            goto Cache_ready
         else
            if ( file is not inuse )
            then
               replace cache entry with current
               goto Cache_ready
            else
               mark file as stale
            endif
          endif
      endif // need new slot in cache
      if ( cache slot not available )
      then
         discard request
         return to main loop
      endif Cache_ready:
         increment cache entry inuse count
         create download record
         schedule download record
         return to main loop endwhile
```

FIG. 11

PDU SCHEDULER PSEUDOCODE

```
while (TRUE)
    wait for timer tick

Start_slot:
    if ( scheduler slot empty )
    then
        back to main loop
    endif while ( more download request blocks)
        get download request block
        build PDU from cache data
        send PDU if ( send failure )
        then
            // quit immediately
            back to main loop
        else
            update request block info
        endif if ( download not completed )
        then
            calculate new scheduler slot for request
            reschedule request
        else
            decrement cache entry inuse count
            discard request block
        endif
    endwhile increment scheduler slot
    if ( servicing this slot has overrun timer )
    then
        goto Start_slot
    endif endwhile
```

DATA TRANSFER SERVER WITH TIME SLOTS SCHEDULING BASE ON TRANSFER RATE AND PREDETERMINED DATA

RELATED APPLICATIONS

This application is related to copending U.S. patent applications (1) Ser. No. 08/749,688 entitled "STATELESS DATA TRANSFER PROTOCOL WITH CLIENT CONTROLLED TRANSFER UNIT SIZE", and (2) Ser. No. 08/749,689, entitled "STATELESS RATE-CONTROLLED DATA TRANSFER PROTOCOL", which were filed concurrently herewith and are incorporated herein by reference.

FIELD OF THE INVENTION

The present invention relates generally to data transfer protocols and, in particular, to a binary large asset stateless transfer (BLAST) protocol for transferring data files in a client-server environment.

BACKGROUND OF THE INVENTION

Referring to FIG. 1, as is well known, computer systems attached to data networks 10 are often connected in a client-server fashion, with a single server 12 servicing requests from multiple clients 14. The number of clients 14 that can be serviced by a single server 12, and thus the cost-effectiveness of the system, is dependent on how efficiently each transaction can be processed.

There are two chief costs to be considered in the design of such a system. One is the computational efficiency of the transfer protocol itself, and the other is the effective utilization of the network 10 between the client 14 and the server 12.

The computational efficiency of the protocol is a measure of the amount of work to be performed by the endpoints, namely the client 14 and server 12, in order to reliably transfer a given amount of information. The focus of attention is on the work required by the server 12, since it is processing requests from a potentially very large number of clients 14. The less work that needs to be performed by the server 12, the lower the cost to the system for providing the service.

From the point of view of the server 12, there are two components to the computational cost of a data transfer protocol. The first is the cost of actually transferring the desired data, and the second is the protocol overhead, which includes every CPU cycle executed which is not directly involved with transmitting the data. This may include connection setup, acknowledgement processing, retransmission, and connection teardown. It also includes the cost of processing (e.g., interrupts and protocol stack overhead) each unique incoming and outgoing PDU (protocol data unit) and any associated header.

While there is a minimum cost of the data transfer itself that cannot be avoided, the protocol overhead associated with the transfer can be reduced.

An independent problem from computational efficiency is network efficiency, which is a measure of how much useful data is carried through the network 10 to the destination as compared to how much was offered to it. Data loss, typically caused by network congestion, is a factor in any network 10 with shared components, where it is possible for instantaneous network load to exceed capacity. In a reasonably engineered network 10, congestion is typically bursty, corresponding to burstiness in the offered data traffic.

There are several approaches to increasing protocol efficiency, particularly be decreasing the protocol overhead.

One way to decrease protocol overhead is to increase the size of outgoing PDUs. This amortizes the per-PDU cost over a larger amount of data and requires fewer PDUs to complete the transfer, reducing the total cost of the transfer. Trivial File Transfer Protocol (TFTP), which is based on the well known User Datagram Protocol over the Internet Protocol or UDP/IP, is an example of a protocol that allows an increase in its PDU size to gain efficiency.

Another way to decrease protocol overhead is to reduce the number of incoming PDUs. For example, a TFTP file transfer requires one incoming acknowledgement PDU for each outgoing data PDU. This results in a high transfer cost to the server. In contrast, the TCP-based FTP uses a windowing scheme, where multiple outgoing PDUs may be acknowledged by a single incoming PDU.

Yet another way involves selective retransmission. Windowed protocols that use a go-back-n retransmission scheme can cause successfully received data to be discarded and retransmitted. By causing only the lost data to be retransmitted, unnecessary work at the server can be avoided. Protocols such as XTP implement selective retransmission.

Some transport mechanisms, such as a connectionless transport mechanism, are inherently simpler and more efficient than others. A connectionless, non-guaranteed service like UDP/IP, (as used by TFTP) may be considerably more efficient than reliable, connection-oriented TCP or ISO TP4 for data movement. However, since UDP does not provide the same traffic integrity guarantees as TCP, the responsibility for ensuring reliable transfer lies with the file transfer mechanism itself rather than the underlying system.

All else being equal, increasing either the PDU size or the acknowledgement window increases the chance of network congestion. More data is being sent in each burst to the network. Unless there is some sort of way to limit this traffic, network congestion will increase, leading to data loss and more retransmission, leading back to more work for the server. Unfortunately, most solutions which increase network efficiency tend to increase the computational cost of moving data.

Though designed as an end-to-end mechanism to prevent message loss due to buffer depletion, modified flow control mechanisms can be used to aid network stability. TCP takes an approach that dynamically varies the acknowledgement window based on end-to-end message loss. This can detect and recover from network congestion, but at the cost of considerable overhead on the part of the sender, and at the cost of needing to induce network congestion before it can be detected.

Another solution to network congestion is explicit peer-to-peer rate/flow control, as exemplified in the ATM ABR (available bit rate) scheme. In this scheme, the instantaneously available network bandwidth is advertised to the endpoints, which are expected to limit output accordingly. Unfortunately, this capability is not widely available and is computationally expensive both for the server and the network.

SUMMARY OF THE INVENTION

It is an object of the present invention to provide a new and improved data transfer protocol and, in particular, a data transfer server implementing the protocol.

The invention, therefore, according to a first broad aspect provides a method of operating a data transfer server, comprising the steps of: defining a circular ordering of individual scheduling timeslots having zero or more download records, each of which includes information of remaining data to transfer from identified data, a transfer rate and a destination address; selecting in sequence, at a predetermined rate, the individual scheduling timeslots; and servicing, responsive to the selected timeslot having at least one download record, each record therein by: (i) sending, to the destination address, a download message which includes a block of data extracted from the identified data, based on the remaining data information; (ii) updating the remaining data information to reflect the block of data that was sent; and (iii) resheduling, based on the transfer rate and the predetermined rate, the download record into an appropriate one of the scheduling timeslots; whereby, in the servicing of each download record, successive download messages having respective blocks of data extracted from the identified data are sent at a rate less than or substantially equal to the transfer rate in that record.

In accordance with a second broad aspect of the invention, there is provided a data transfer server, comprising: means for defining a circular ordering of individual scheduling timeslots having zero or more download records, each of which includes information of remaining data to transfer from identified data, a transfer rate and a destination address; means for selecting in sequence, at a predetermined rate, the individual scheduling timeslots; and means for servicing, responsive to the selected timeslot having at least one download record, each record therein, the means for servicing including: (i) means for sending, to the destination address, a download message which includes a block of data extracted from the identified data, based on the remaining data information; (ii) means for updating the remaining data information to reflect the block of data that was sent; and (iii) means for resheduling, based on the transfer rate and the predetermined rate, the download record into an appropriate one of the scheduling timeslots; whereby, in the servicing of each download record, successive download messages having respective blocks of data extracted from the identified data are sent at a rate less than or substantially equal to the transfer rate in that record.

A binary large asset stateless transfer (BLAST) data communications protocol, embodying the present invention, provides a simple, reliable and highly scaleable data transfer facility in a digital data network, interconnecting a file server and a client. A connectionless, unacknowledged data transfer protocol minimizes resource utilization at the data server and is combined with source rate control to reduce congestion in the intervening network.

The BLAST protocol is focused on making the function of the file server as simple as possible. To that end, a system was designed with the following features.

A connectionless transport mechanism is used, to eliminate any overhead in connection establishment and maintenance.

PDU traffic to the server is reduced by using an unacknowledged transfer protocol requiring, in most cases, only a single request to initiate the transfer of all of the data. Transfer time is made largely independent of network end-to-end delay.

Network congestion is limited by regulating the data transfer based on a rate-control parameter. In order to accommodate widely varying capabilities of clients, the requesting client specifies the maximum PDU size and PDU rate in the data request. The server may further reduce these maximums according to its own requirements.

The loss of data is detected by the client and selectively re-requested by the client. The re-requests are completely unique data requests to the server, eliminating any need for client state information to be kept or correlated at the server.

The client has the responsibility to correlate re-requested segments with the original request, and verifying the data is still current.

Client heuristics may be applied to adjust PDU size and rate for requests if patterns of message loss indicate there is network congestion.

The basic rate-control scheme of BLAST is applicable to any data transfer, not just reliable file transfer. This includes the area of streaming video or voice protocols.

BLAST combines an unacknowledged, stateless protocol to increase server scalability; rate control to minimize potential of network congestion; and responsibility for reliable transfer residing in the client.

BRIEF DESCRIPTION OF THE DRAWINGS

The invention will be better understood from the following description of a binary large asset stateless transfer (BLAST) protocol, together with reference to the accompanying drawings in which:

FIG. 2 is a structural representation of a message header in the BLAST protocol;

FIG. 3 is a structural representation of a GetFilesize message in the BLAST protocol;

FIG. 4 is a structural representation of a FilesizeData message in the BLAST protocol;

FIG. 5 is a structural representation of a DownloadStart message in the BLAST protocol;

FIG. 6 is a structural representation of a DownloadData message in the BLAST protocol;

FIG. 11 illustrates exemplary pseudocode whereby a Request Handler task may be implemented in the BLAST server; and FIG. 12 illustrates exemplary pseudocode whereby a PDU Scheduler task may be implemented in the BLAST server.

DETAILED DESCRIPTION

Figure 1:
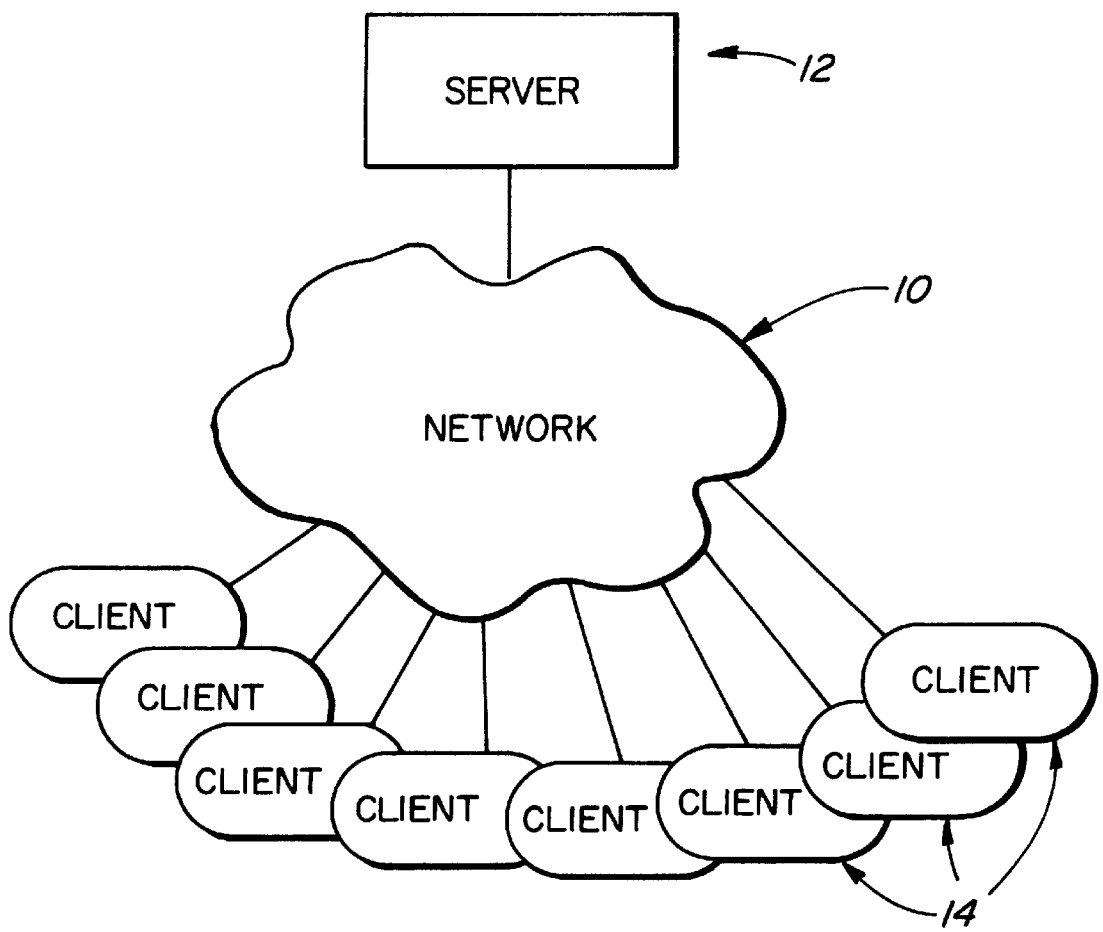
FIG. 1 is a schematic representation of a prior art client-server environment.

Having regard to FIG. 1, a binary large asset stateless transfer (BLAST) protocol, in accordance with the invention, provides a mechanism for transferring data files from a server 12 to any of a plurality of clients 14 which communicate through signalling carried by a data network 10. The server 12 and clients 14 are representative of typical data processing platforms suitable for the stated purposes. The data network 10 may be any conventional data communications technology, examples for which include frame relay or asynchronous transfer mode packet switched networks, and an Ethernet local area network running over which is the Internet protocol (IP). The BLAST protocol may be stacked on the network particular protocol(s) to effect the signalling exchanges between the server 12 and each client 14.

The BLAST protocol characterizes a stateless, rate-controlled request/response file transfer protocol. A request for one or many files, in whole or in part, is sent from a particular client 14 to the server 12. The request is identified by a client-unique transaction ID.

The request specifies not only the file(s) to be downloaded, but also includes information that tells the server 12 how the file is to be delivered. This includes the maximum size of an individual data packet and the maximum rate at which the packets can be processed. This is to accommodate a wide range of client configurations. The server 12, upon receiving a request, may further reduce the size and rate of data packets that will be used for the transfer, depending on the current loads of both the server 12 and the network 10. The server 12 then schedules the request and begins transmitting sequential data packets, containing the client-unique transaction ID, at the appropriate rate.

The regular stream of data packets arrives at the client 14 and are assembled into the original file. Each packet identifies its position in the file, and so can be handled independently of any other. There are no acknowledgements of any kind. The server 12 does not know or care whether the individual packets arrive at the client 14. Since the server 12 may be responsible for servicing requests from a very large number of clients 14, the reduction in message load greatly improves the scalability of the protocol. When the data specified in the original request has been sent, the transaction is completed from the server's point of view.

Data integrity is managed by the client 14. The client 14 must examine the received data and decide how to proceed. If there are 'gaps' in the received data, as will be the case where there is message loss, the client 14 must initiate a new request for the missing data. There are many possible heuristic algorithms that can be used by the client 14 to get the missing data. It may wait until the original request is completed before rerequesting the data, or it may rerequest as soon as it notices a gap in the file. It might do a request for each gap, it might group gaps together, or it might simply rerequest the whole file. If the missing data exceeds a certain threshold, then network congestion can be assumed, and the rerequests can be made with a lower rate and/or a smaller data size specified. At the server 12, each rerequest by the client 14 is seen as a completely new request. There is no relationship known at the server 12 between any two past, present, or future requests. This further reduces the complexity, and improves the scalability of the server 12.

Signalling between the server 12 and each client 14 to effect the BLAST protocol is implemented by various messages which are transmitted therebetween, via the network 10. Particular embodiments of these BLAST protocol messages are described below and illustrated in FIGS. 2 to 6. Though the messages described pertain to a specific UDP/IP-based implementation of the BLAST protocol, it should be understood that nothing restricts this from being implemented over any other protocol stack, or in other operating environments. Similarly, PDU data field sizes are shown as present in this implementation, but are not necessarily restricted to the indicated size which may be adapted to satisfy requirements of the particular application.

Referring to FIG. 2, every BLAST protocol message shares a common header, identified herein as messageHeader, to simplify message interpretation. The messageHeader defines a set of parameters at the start of each message sent between the BLAST server and client. Fields forming part of the messageHeader include:

version—Parameter identifies a protocol version number which is used to ensure compatibility of messages.

messageID—A message type identifier parameter.

messageLength—Parameter indicates the total length of the entire message in bytes, including the message header 20.

transactionID—An arbitrary client assigned parameter used to associate data blocks with their respective requests.

Referring to FIG. 3, a GetFilesize message is illustrated. This message requests that the server reply with the size of the requested file, so that the client can ensure sufficient resources are available and allocated to receive it. Fields forming part of the GetFilesize message include:

messageHeader—Contains parameters as described above in connection with FIG. 2. In particular, the messageID parameter, for example, equals 00F5 Hex by which value the GetFilesize message is identified.

destinationAddress—Parameter identifies the IP address of the client.

destinationport—Parameter identifies the UDP port of the client.

fileDescriptorLength—Parameter indicates the length of the fileDescriptor in bytes.

fileDescriptor—Parameter identifies the requested file by providing a null-terminated full pathname of the file to be transferred.

Referring to FIG. 4, a FilesizeData message is illustrated. This message is a reply sent from the server to the client to satisfy the GetFileSize request message. Fields forming part of the FilesizeData message include:

messageHeader—Includes parameters as described above in connection with FIG. 2. In particular, the messageID parameter, for example, equals 00F6 Hex by which value the FilesizeData message is identified.

filesize—The size of the file, specified in the GetFilesize message, in bytes. If the file could not be found in the BLAST filesystem, the filesize will be 0.

Referring to FIG. 5, a DownloadStart message is illustrated. This message is sent from the client to the server to initiate the data transfer for a requested file. Fields forming part of the DownloadStart message include:

messageHeader—Contains parameters as described above in connection with FIG. 2. In particular, the messageID parameter, for example, equals 00F3 Hex by which value the DownloadStart message is identified.

blockSize—Parameter indicates a maximum PDU (i.e., data block or packet) size for the server to use.

startByte—Parameter provides an offset within the file at which byte of data transfer is to begin (i.e., the first byte to send). The beginning of the file has an offset value of 0.

numBytes—Parameter indicates the total number of bytes of the file to send. A value of 0 indicates the entire file, or remainder of the file starting from the offset byte position when the offset parameter is greater than 0.

destinationAddress—Parameter identifies the IP address of the download client.

destinationport—Parameter identifies the UDP port of the download client.

delay—Parameter indicates a minimum delay in microseconds between sending successive data PDUs.

fileDescriptorLength—Parameter indicates the length of the fileDescriptor in bytes.

fileDescriptor—Parameter identifies the requested file by providing a null-terminated full pathname of the file to be transferred.

Referring to FIG. 6, a DownloadData message is illustrated. This message contains the actual data for the file transfer. The blocks of data are divided into the blocksize bytes of data, as specified in the DownloadStart message, and sent in order to the client. Fields forming part of the DownloadData message include:

- messageHeader—Contains parameters as described above in connection with FIG. 2. In particular, the messageID parameter, for example, equals 00F4 Hex by which value the DownloadData message is identified.
- firstByte—Parameter provides an offset into the file for the first byte of this data block. An offset value of 0 corresponds to the first byte in the file.
- numBytes—Parameter indicates the number of data bytes in this block.
- edition—Parameter identifies a version number of the file being downloaded. This allows the client to ensure that rerequests are being made from the same file as an initial request.
- data—This parameter is the block of data payload being carried by this message.

Figure 7:
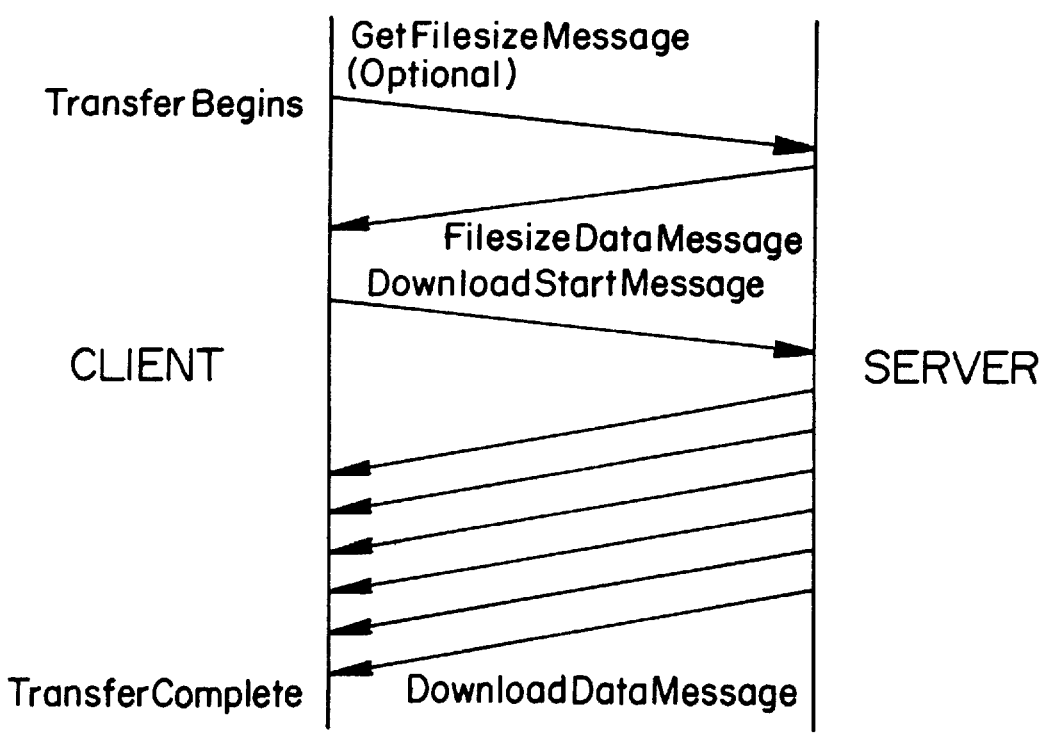
FIG. 7 is a timing graph illustrating protocol behaviour during successful transfer.

Operation of the BLAST protocol will now be described with reference to FIG. 7 which illustrates protocol behaviour during a successful transfer.

The BLAST client is invoked when a data transfer from the server is required. At any time, but typically before a transfer request, the client may optionally make a request to the BLAST server for data file size information. An appropriate GetFilesize message is constructed and sent. In reply, the server sends a FilesizeData message providing the size information in respect of the file identified in the GetFilesize message. Depending on the implementation environment, this size information may be required for buffer allocation in order to ensure sufficient memory is available before a transfer or to return the information directly to the ultimate user.

To initiate a data transfer, the client sends a request, specifically the DownloadStart message, to the server containing the desired file name, the bytes of the file that are to be transferred, and the maximum PDU size and rate that are to be used in the transmission. A timer is then set by the client to await the arrival of the first incoming data PDU, specifically a first DownloadData message. The value of the timer should be relatively large, on the order of seconds, in order to avoid prematurely giving up on the request. If the timer times out, there are three possibilities. Either the original request was lost in the network, the request was discarded by the server due to overload, or the data PDUs are in transit. In the first two cases, the behaviour of the client will be to retry the request anyway, increasing the timeout with each retry. The consequences of waiting too little outweigh the cost of waiting too long.

If the request was successful, data PDUs will begin arriving in successive DownloadData messages which the server sends periodically until the transfer is finished. Each DownloadData message identifies its position in the file, and the respective data blocks may be placed directly into a buffer by the client. A record of the data PDUs received is maintained by the client. The mechanism for detection of the end of the transfer is left to the client. This can be detected by the arrival of the last requested byte of the file, or by the failure to receive data for a certain interval.

Figure 8:
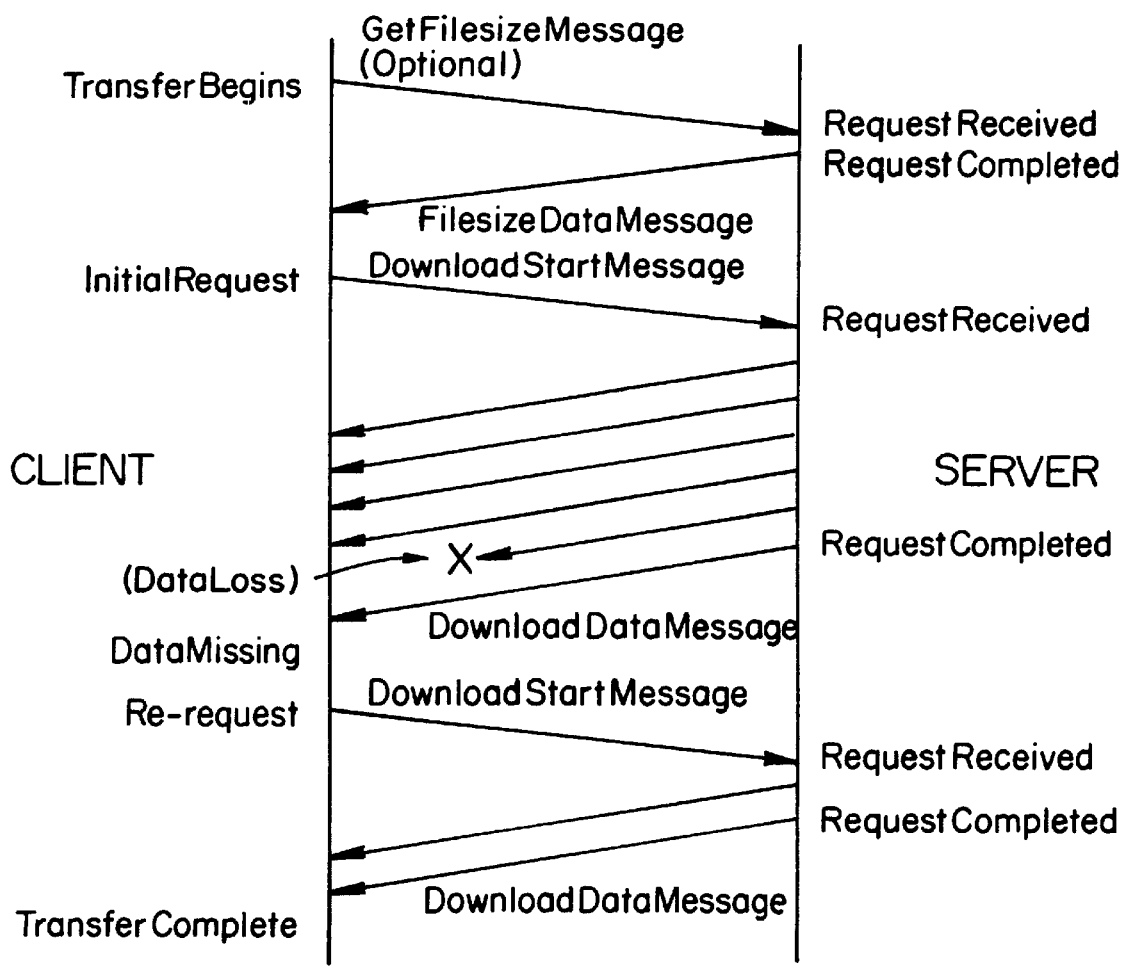
FIG. 8 is a timing graph illustrating protocol behaviour during errored transfer.

With reference to FIG. 8, detection of any data loss and a re-request strategy is up to the client. An implementation might have the client watching for gaps in the received data, and re-requesting the missing data either before the initial transfer is even complete or wait until the initial transfer is finished. The cumulative transfer rates of running initial requests and re-requests concurrently must of course be within the bounds of the clients PDU processing capabilities and the capacity of the intervening network. The re-request involves the client sending another DownloadStart message which requests the same data file as in the initial request but indicates that the server only transfer the data starting at an offset from the first byte of that file, corresponding to the missing block of data. In the exemplary scenario depicted by FIG. 8, the DownloadStart message requests the remainder of the file (beginning with the missing block), responsive to which the server sends two successive DownloadData messages, the first of which containing the data block that was previously missing.

When re-requested data is received, the client must examine the edition code of the file. This is used to ensure that the file did not change between the original request and the re-request. If the edition code has changed, the client assumes that the entire transfer has been invalidated and must begin anew.

Figure 9A:
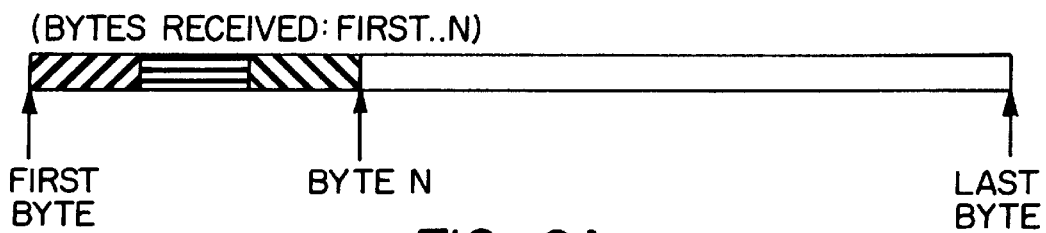
FIGS. 9A, 9B, 9C, 9D, and 9E, illustrate client processing of downloaded data PDUs.
Figure 9B:
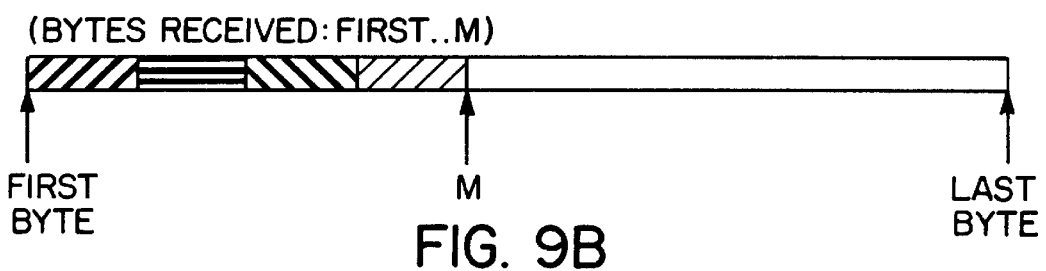
Figure 9C:
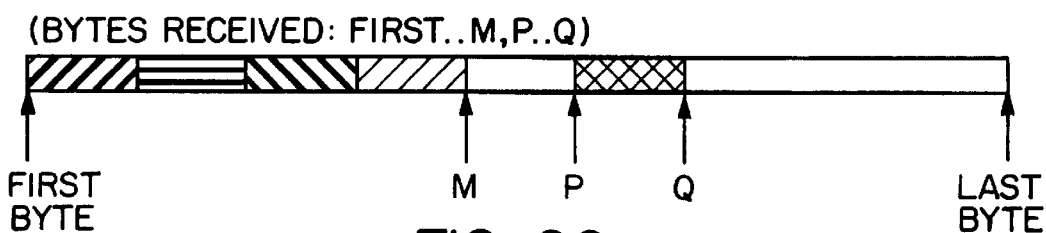
Figure 9D:
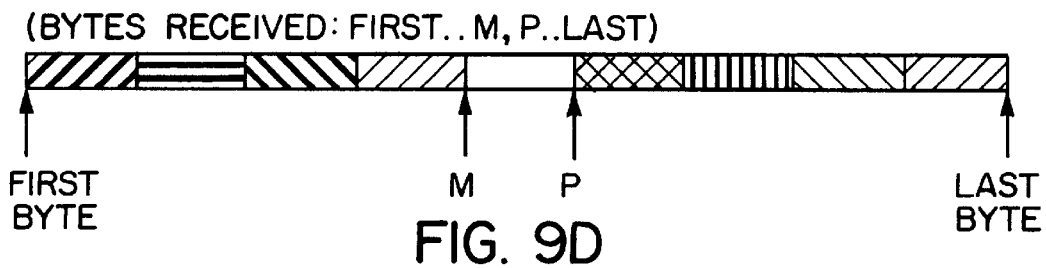
Figure 9E:
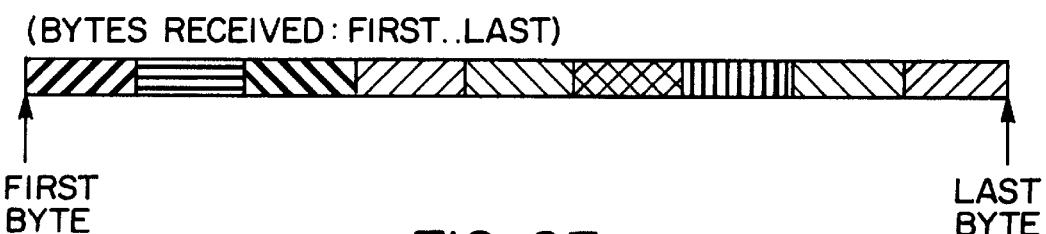

Detection of data loss by the client will be explained in more detail, with reference to FIG. 9. In FIG. 9A, three successive data PDUs (i.e., DownloadData messages) have been successfully received, which contained the first to N bytes of the data file being transferred. As described above, each data PDU, for the block of data therein, specifies the offset into the data file of the first byte of that data block and also the size of that data block. The client can then determine whether the next received data PDU is contiguous based on the offset and size parameters from the prior (last received) PDU. For example, such may simply involve calculating from the start byte offset and the size parameters, an offset value for the end byte of the received data block, in terms of the end byte position within the data file, and comparing the calculated end byte offset with the offset parameter for the start byte taken from the next received data PDU. If the new start byte is contiguous with the previous end byte, the two ranges are coalesced. As illustrated in FIG. 9B, the next PDU (N+1..M) having N+1 to M bytes of data payload arrives and, its payload is inserted into the correct position of the buffer. If the new start byte is not contiguous with the previous end byte, we have identified a missing range of bytes. In FIG. 9C, data PDU (P..Q) arrives. Missing data (M+1..P−1) is detected. If desired, a new download request can be generated immediately for the missing range, or the client can wait until all frames have arrived and decide what needs to be re-requested. In the simplest case, the whole file could be requested again. For example, in FIG. 9D, three more data PDUs arrive, including the last byte of the requested transfer. The missing data is re-requested, and in FIG. 9E, data PDU (M+1..P−1) is received. The transfer is now complete.

Figure 10:
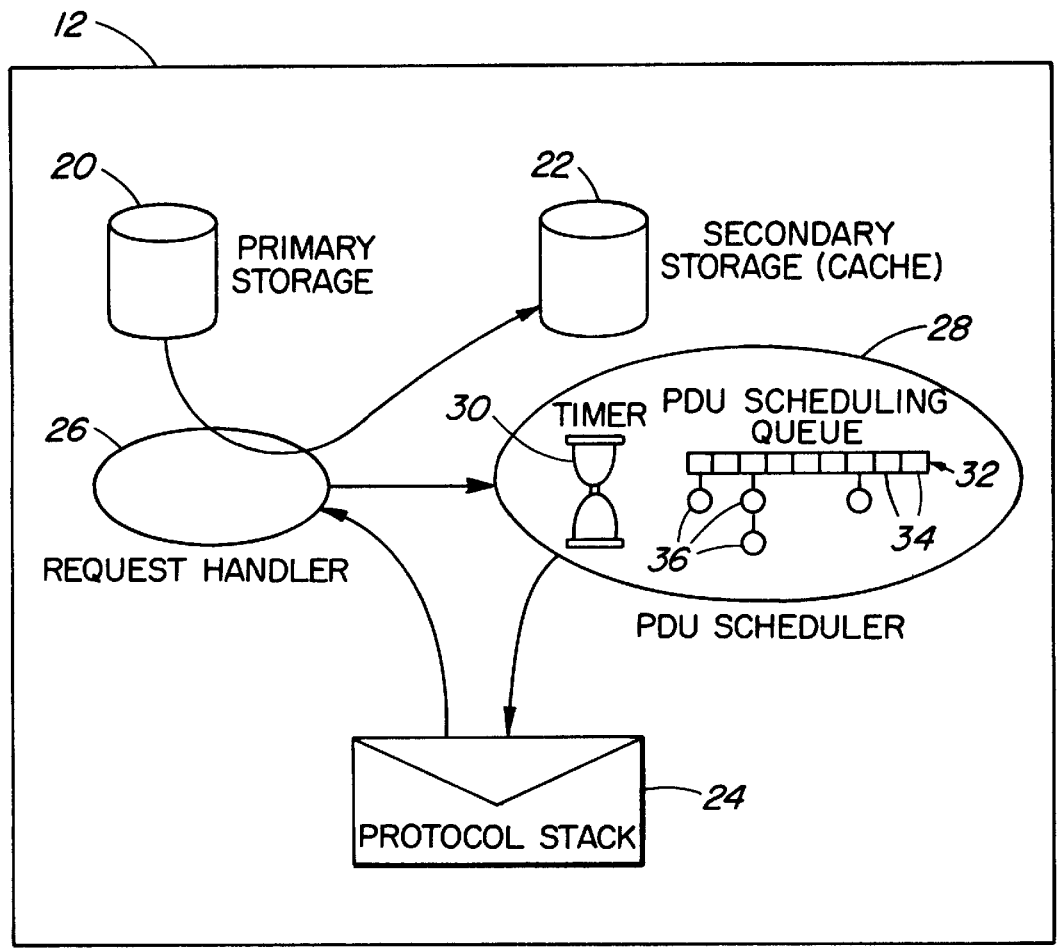
FIG. 10 is a schematic representation of an implementation of the BLAST server.

With regard to FIG. 10, a particular implementation for the functionality of the BLAST server 12 is illustrated. The BLAST server 12 may be implemented by a conventional data processing platform, having a configuration that includes a primary storage 20 on which data files are maintained and a secondary storage as a file cache 22 which provides faster access to files during transfer. A Protocol Stack 24 provides both a physical network interface and stacked on which may be various levels of communications protocols to effectively communicate through the network (10 in FIG. 1), whereby the various BLAST protocol messages, in accordance with this invention, are exchanged with clients of the server 12. A Request Handler 26 is responsible for processing any received client requests, and may be implemented as a software task for which exemplary pseudocode is illustrated in FIG. 11. A PDU Scheduler 28 functions to effect delivery of the processed requests, and includes a timer 30 and scheduling queue 32. The PDU Scheduler 28 may also be implemented as a software task for which exemplary pseudocode is illustrated in FIG. 12.

In operation, the BLAST server 12 is idle until either a filesize request or download request, respectively embodied by a GetFilesize message and a StartDownload message, is received via the Protocol Stack 24, by the Request Handler 26. If the server 12 is overloaded, the determination of which is left to the Request Handler 26, then the request is silently discarded.

If the request is for a filesize, the available filesystem on the primary storage 20 is searched for the file. If the file is found, a filesize response is constructed by the Request Handler 26 and sent, containing the size of the file. If the file is not found, a filesize response is still constructed and sent, but contains a filesize of zero. It is noted that a file of size zero is not downloadable.

If the request is for a file download, and the file exists, then the Request Handler 26 begins preparation for download. The server 12 must have ready access to the download data during the transfer, and therefore, files are first loaded into the cache 22 to ensure such. The file cache 22 is not required, but is consistent with the overall goal of minimizing server workload and the preferred implementation encompasses a cache. If the most recent version of the file is not already present in the cache 22, it is preloaded into the cache 22 before the transfer begins. If an older version of the file is in the cache 22 and it is not in use, it will be replaced. If an older version of the file is in the cache 22 and is in use, that file will be tagged for discard as soon as the current download is completed.

If the cache 22 is full, and there are cache entries not currently being used, determination of the file to replace is done using a least-recently used algorithm. The size of the cache 22 may also be varied to accommodate more files. However, if the cache 22 is full, incoming requests for files not in the cache must be discarded. If an application environment consists of large numbers of homogeneous clients which tend to request the same set of files, cache replacement should be infrequent even with a fairly small cache 22.

The Request Handler 26 of the BLAST server 12 generates a unique edition number every time a file is loaded into the cache 22 and stores this edition number with the cached file, so that it is consistent for the lifetime of that cached file. During the transfer, this edition number is placed by the PDU Scheduler 28 into each data PDU, embodied by a DownloadData message, to allow the client to ensure that original requests and re-requests were serviced from the same underlying data. If a cache system is not used, then some other value must be provided for an edition number, such as, a file timestamp to ensure that the client can differentiate between different vintages of files with the same name.

The download request contains a client-specified maximum PDU size and minimum inter-PDU arrival time. These values are examined by the BLAST server 12, and may be adjusted downwards, based on server or network capabilities or conditions. The maximum PDU size may be adjusted downwards, and the minimum inter-PDU arrival time may be adjusted upwards. The PDU inter-arrival time is adjusted to an appropriate value for the configuration of the server platform. For instance, if the server 12 cannot reliably schedule PDUs at the requested intervals, then the value may be adjusted accordingly. These values may also be subject to some server-defined valid range of values, for example, multiple predetermined rates from which a particular rate may be selected by a client.

In the preferred implementation, the server 12 also has some knowledge of the capabilities and current condition of the server platform and of the capability and topology of the intervening network, and can further discard requests based on these. For example, servicing a large number of concurrent requests from one region of the network could overload that part of the network, even if each individual download is rate controlled, and cause the network congestion that the rate control scheme tries to prevent. Ideally, situations like this may be predicted by the server 12 and requests can be discarded appropriately. It is noted that filtering download requests or even maintaining a count of concurrent transfers requires some internal server state information to be maintained. However, the BLAST transfer protocol is still stateless with respect to individual clients and individual requests.

When the file is prepared for transmission, a record containing the particulars of the requested download is created and placed into the PDU scheduling queue 32 by the Request Handler 26. Individual download record entries in the PDU scheduling queue 32 are identified by reference 36.

The PDU scheduling queue 32 may be constructed as a circular queue of scheduling timeslots 34, each of which is a data structure formatted as a list of download records 36. However, a timeslot 34 may have a list which is empty when there are no download records to process. The download records 36 represents downloads in progress and each record 36 contains the file identifier, the PDU size and interval, the destination client address and port, the client unique transaction ID, and the remaining bytes to be sent for that download.

The minimum size of the PDU scheduling queue 32 is determined by granularity of the timer 30 (i.e., interval between timer ticks) and a maximum inter-PDU delay allowed by the server 12. There must be more scheduling timeslots 34 than results from dividing the maximum inter-PDU delay by the slot granularity, in order to ensure that rescheduling a download record 36 for the maximum inter-PDU delay does not result in it wrapping around the circular queue 32.

At periodic intervals, according to the minimum granularity of the timer 30 used by the PDU Scheduler 28, each timeslot 34 in the PDU scheduling queue 32 is checked, in sequence, for any download records 36 to be serviced. If there are no download records 36 present in a particular timeslot 34, there is no work to be done and the PDU scheduler 28 sleeps until the next timer tick, responsive to which the following timeslot 34 is checked.

If there are download records 36 present, each download record 36 in turn is retrieved and serviced. Servicing each download record 36 consists of taking a block of data, according to the PDU size and remaining bytes information in that record 36, from the identified file and sending the data block as the next data PDU for that download. If the last PDU for a download has been sent (i.e., transfer of all data in the identified file has been completed), the download record 36 is discarded. If the download is not complete, the download record 36 is updated and rescheduled into the next appropriate timeslot 34 in the PDU scheduling queue 32, determined from the PDU rate contained in the download record 36.

Depending on the number of downloads allowed to proceed at once and the granularity of the timer 30 (i.e., time interval between successive ticks), it may be possible that processing all the download records 36 attached to a particular PDU scheduler timeslot 34 takes longer than the time available. For example, the server 12 is still processing download records 36 at timeslot N when the timer 30 ticks whereby it is time to process slot N+1. This can be considered an instantaneous overload of the server 12, and repeated occurrances of this condition may be used to adjust the request discard policy for future requests. When this occurs, the server 12 should finish processing slot N and move immediately to slot N+1, until it has caught up.

Even though the server rate controls individual downloads, since multiple download records 36 can be processed in each iteration, it may still be presenting extremely bursty traffic to the underlying protocol stack and to the attached network, which may cause a local failure. If this is detectable to the server 12, for example by a return code from a message sending primitive, then the server 12 should defer further work in that scheduling timeslot 34 and reschedule all remaining download requests 36 until the next available timeslot 34.

The preferred implementation of the PDU Scheduler 28 should have a tick granularity for the timer 30 (corresponding to timeslot granularity for the PDU scheduling queue 32) that is considerably smaller than the minimum inter-PDU delay. As long as download requests arrive relatively randomly, distribution of outstanding requests within the scheduler timeslots 34 will be improved, and the chance of server overloads will be reduced.

It is acceptable for the server 12 to service a download at a lower rate than requested, and this may occur during periods of overload, but care must be taken that the inter-PDU delay for a particular download is never less than the client specified time.

Those skilled in the art will recognize that various modifications and changes could be made to the invention without departing from the spirit and scope thereof. It should therefore be understood that the claims are not to be considered as being limited to the precise embodiments of the BLAST protocol and server set forth above, in the absence of specific limitations directed to each embodiment.

We claim:

1. A method of operating a data transfer server, comprising the steps of:

defining a circular ordering of individual scheduling timeslots having zero or more download records, each of which includes information of remaining data to transfer from identified data, a transfer rate and a destination address;

selecting in sequence, at a predetermined rate, the individual scheduling timeslots; and servicing, responsive to the selected timeslot having at least one download record, each record therein by:
   (i) sending, to the destination address, a download message which includes a block of data extracted from the identified data, based on the remaining data information;
   (ii) updating the remaining data information to reflect the block of data that was sent; and
   (iii) rescheduling, based on the transfer rate and the predetermined rate, the download record into an appropriate one of the scheduling timeslots;

whereby, in the servicing of each download record, successive download messages having respective blocks of data extracted from the identified data are sent at a rate less than or substantially equal to the transfer rate in that record.

2. A method as claimed in claim 1, wherein the circular ordering of individual scheduling timeslots is a circular queue of the scheduling timeslots, each of which is data structure formatted as a list of the zero or more download records.

3. A method as claimed in claim 1, comprising the steps of:

receiving a download request message which references the identified data and specifies the transfer rate;

generating, responsive to confirming the identified data is available, a corresponding download record; and inserting the corresponding download record into one of the scheduling timeslots.

4. A method as claimed in claim 3, wherein the identified data is available on a storage device; and further comprising:

loading the identified data from the storage device into a cache memory; and extracting, in the servicing of the corresponding download record, each block of data from the identified data in the cache memory.

5. A method as claimed in claim 4, comprising the step of:

generating a unique edition number associated with the identified data;

storing the edition number with the identified data loaded into the cache memory; and providing the edition number in each download message whose block of data is extracted from the identified data in the cache memory.

6. A method as claimed in claim 5, comprising providing in each download message an indication of position for its block of data within the identified data.

7. A method as claimed in claim 1, wherein the step of rescheduling the download record includes:

discarding, responsive to the remaining data information indicating all the identified data has been transferred, the download record; and inserting, responsive to the remaining data information indicating otherwise, the download record in the appropriate one of the scheduling timeslots.

8. A method as claimed in claim 3, wherein the download request message specifies the transfer rate by indicating a minimum interval period between sending the successive download messages.

9. A method as claimed in claim 3, wherein the download request message specifies a transfer unit size; and the step of sending the download message includes:

extracting, from the identified data, the block of data having a size less than or substantially equal to the transfer unit size; and constructing the download message which includes the block of data and the destination address.

10. A data transfer server, comprising:

means for defining a circular ordering of individual scheduling timeslots having zero or more download records, each of which includes information of remaining data to transfer from identified data, a transfer rate and a destination address;

means for selecting in sequence, at a predetermined rate, the individual scheduling timeslots; and means for servicing, responsive to the selected timeslot having at least one download record, each record therein, the means for servicing including:
    (i) means for sending, to the destination address, a download message which includes a block of data extracted from the identified data, based on the remaining data information;

(ii) means for updating the remaining data information to reflect the block of data that was sent; and (iii) means for rescheduling, based on the transfer rate and the predetermined rate, the download record into an appropriate one of the scheduling timeslots;

whereby, in the servicing of each download record, successive download messages having respective blocks of data extracted from the identified data are sent at a rate less than or substantially equal to the transfer rate in that record.

11. A data transfer server as claimed in claim 10, wherein the circular ordering of individual scheduling timeslots is a circular queue of the scheduling timeslots, each of which is data structure formatted as a list of the zero or more download records.

12. A data transfer server as claimed in claim 10, comprising:

means for receiving a download request message which references the identified data and specifies the transfer rate;

means for generating, responsive to confirming the identified data is available, a corresponding download record; and means for inserting the corresponding download record into one of the scheduling timeslots.

13. A data transfer server as claimed in claim 12, wherein the identified data is available on a storage device; and further comprising:

means for loading the identified data from the storage device into a cache memory; and means for extracting, in the servicing of the corresponding download record, each block of data from the identified data in the cache memory.

14. A data transfer server as claimed in claim 13, comprising:

means for generating a unique edition number associated with the identified data;

means for storing the edition number with the identified data loaded into the cache memory; and means for providing the edition number in each download message whose block of data is extracted from the identified data in the cache memory.

15. A data transfer server as claimed in claim 14, comprising means for providing in each download message an indication of position for its block of data within the identified data.

16. A data transfer server as claimed in claim 10, wherein means for rescheduling the download record includes:

means for discarding, responsive to the remaining data information indicating all the identified data has been transferred, the download record; and means for inserting, responsive to the remaining data information indicating otherwise, the download record in the appropriate one of the scheduling timeslots.

17. A data transfer server as claimed in claim 12, wherein the download request message specifies the transfer rate by indicating a minimum interval period between sending the successive download messages.

18. A data transfer server as claimed in claim 12, wherein the download request message specifies a transfer unit size; and the means for sending the download message includes:

means for extracting, from the identified data, the block of data having a size less than or substantially equal to the transfer unit size; and means for constructing the download message which includes the block of data and the destination address.

* * * * *